(12) United States Patent
Hamann et al.

(10) Patent No.: US 11,242,792 B2
(45) Date of Patent: Feb. 8, 2022

(54) SENSOR AND PRODUCTION METHOD THEREFOR FOR USE IN AN EXHAUST GAS STREAM OF AN INTERNAL COMBUSTION ENGINE

(71) Applicant: CPT Group GmbH, Hannover (DE)

(72) Inventors: Christoph Hamann, Thalmassing (DE); Kay Schwarzkopf, Regensburg (DE); Stefan Kohn, Hohenburg (DE); Hajo Gugel, Regensburg (DE); Tim Walde, Regensburg (DE); Christian Kiefl, Münster (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 261 days.

(21) Appl. No.: 16/483,411

(22) PCT Filed: Feb. 1, 2018

(86) PCT No.: PCT/EP2018/052564
§ 371 (c)(1),
(2) Date: Aug. 3, 2019

(87) PCT Pub. No.: WO2018/141870
PCT Pub. Date: Aug. 9, 2018

(65) Prior Publication Data
US 2020/0011227 A1     Jan. 9, 2020

(30) Foreign Application Priority Data
Feb. 3, 2017  (DE) .................. 10 2017 201 724.4

(51) Int. Cl.
*F01N 11/00*   (2006.01)
*G01N 15/06*   (2006.01)
*G01N 15/00*   (2006.01)

(52) U.S. Cl.
CPC ....... *F01N 11/007* (2013.01); *G01N 15/0656* (2013.01); *F01N 2560/05* (2013.01); *G01N 2015/0046* (2013.01)

(58) Field of Classification Search
CPC .............. F01N 11/007; F01N 2560/05; G01N 15/0656; G01N 2015/0046; G01N 1/2252
See application file for complete search history.

(56) References Cited

U.S. PATENT DOCUMENTS

| | | | |
|---|---|---|---|
| 4,656,832 A | 4/1987 | Yukihisa | ......................... 60/303 |
| 2017/0138892 A1* | 5/2017 | Saitou | ................ G01N 27/4073 |

(Continued)

FOREIGN PATENT DOCUMENTS

| | | | |
|---|---|---|---|
| DE | 195 23 978 C2 | 6/1995 | ........... G01N 27/407 |
| DE | 101 17 189 A1 | 4/2001 | ........... G01N 27/407 |

(Continued)

OTHER PUBLICATIONS

English Machine Translation of Moebius, DE 10117189 A1, Oct. 31, 2002, translated online Jun. 2021 (Year: 2002).*

(Continued)

*Primary Examiner* — David Z Huang
(74) *Attorney, Agent, or Firm* — Slayden Grubert Beard PLLC

(57) ABSTRACT

Various embodiments include a method for the production of a sensor for an exhaust gas stream of an internal combustion engine, wherein the sensor comprises a first electrode and a second electrode. The method comprises: arranging a glass solder in a mold substantially between and substantially insulating the first electrode and the second electrode; arranging an insulating element in the mold in contact with a free surface of the glass solder; and finish molding the glass solder into a glass insulator together with the insulating element in a predetermined position relative to the first (Continued)

electrode and the second electrode. The insulating element shapes the glass insulator during the finish molding and at least partially isolates the glass insulator from the exhaust gas of the internal combustion engine during a measuring operation of the sensor.

10 Claims, 1 Drawing Sheet

(56) References Cited

U.S. PATENT DOCUMENTS

| | | | |
|---|---|---|---|
| 2017/0356868 A1 | 12/2017 | Asmus | G01N 27/07 |
| 2019/0064045 A1* | 2/2019 | Kiefl | G01N 15/0656 |

FOREIGN PATENT DOCUMENTS

| | | | |
|---|---|---|---|
| DE | 10 2005 021 131 A1 | 5/2005 | G01N 27/04 |
| DE | 10 2007 062 802 A1 | 12/2007 | G01N 27/403 |
| DE | 10 2009 000 318 A1 | 1/2009 | G01N 27/04 |
| DE | 10 2011 008 171 A1 | 1/2011 | G01D 11/24 |
| DE | 10 2015 122 668 A1 | 12/2015 | G01N 15/06 |
| WO | 2008/125400 A1 | 10/2008 | G01N 24/407 |
| WO | 2012/161754 A1 | 5/2011 | G01N 27/00 |

OTHER PUBLICATIONS

Search Report for German Patent Application No. 10 2017 201 724.4, 6 pages, dated Feb. 5, 2018.
Search Report for International Application No. PCT/EP2018/052564, 13 pages, dated Jun. 13, 2018.

* cited by examiner

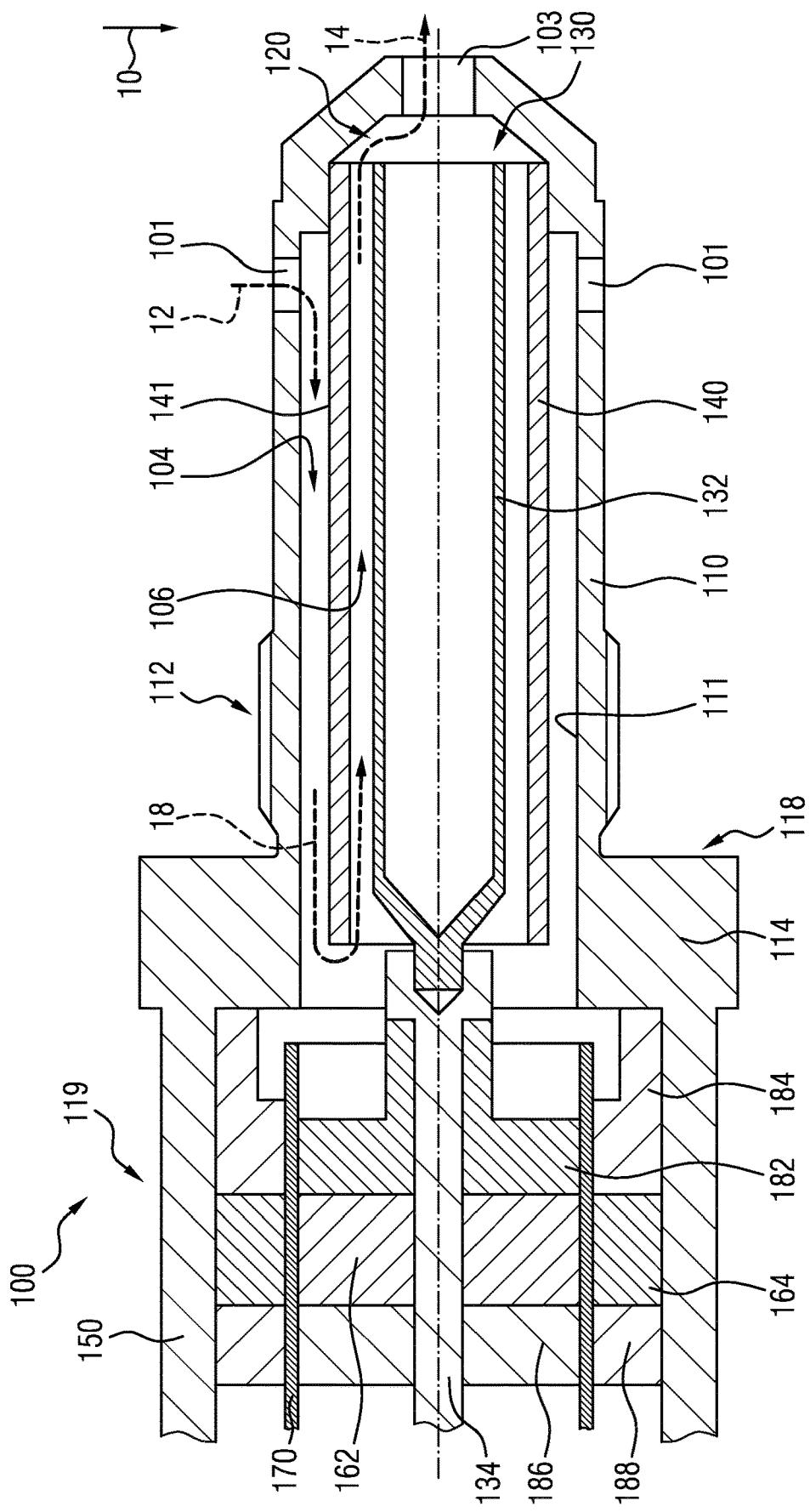

SENSOR AND PRODUCTION METHOD THEREFOR FOR USE IN AN EXHAUST GAS STREAM OF AN INTERNAL COMBUSTION ENGINE

CROSS-REFERENCE TO RELATED APPLICATIONS

This application is a U.S. National Stage Application of International Application No. PCT/EP2018/052564 filed Feb. 1, 2018, which designates the United States of America, and claims priority to DE Application No. 10 2017 201 724.4 filed Feb. 3, 2017, the contents of which are hereby incorporated by reference in their entirety.

TECHNICAL FIELD

The present disclosure relates to internal combustion engines. Various embodiment may include sensors for use in an exhaust gas stream of an internal combustion engine, and/or methods for producing same, e.g. particle sensors for determining the quantity of particles in the exhaust gas of the internal combustion engine.

BACKGROUND

Sensors for a wide variety of purposes are typically arranged in the exhaust gas of an internal combustion engine. By way of example, particle sensors, nitrogen oxide sensors, oxygen sensors, and/or lambda probes are used to detect various parameters and in order to be able to set the operating parameters of the internal combustion engine in an optimized manner. Electrical and electronic components are often used in such sensors, different electrical potentials often being applied to said components during measurement operation.

Such sensors may use glass solders and glass insulators as electrical insulators. During the production or shaping of the glass insulators, the glass solder is placed into a mold together with the electrodes that are to be insulated from one another. Graphite mold elements such as graphite rings, are usually employed for the shaping during the final molding of the glass solder into a glass insulator at a predetermined temperature for a predetermined period of time; said mold elements are in contact with the hardening glass solder during the finish molding, and thus define the shape of the glass insulators to be produced. Nevertheless, graphite can here at least partially come loose from the graphite mold elements and become deposited on the glass solder or the finished glass insulator, so that even after a removal of the graphite mold elements, graphite can be at least partially present on the glass insulator. This graphite, deposited on the glass insulator, can negatively impair the electrical insulating properties of the glass insulator.

SUMMARY

The teachings of the present disclosure describe sensors which can be used reliably in the exhaust gas of an internal combustion engine and in which the electrical insulating properties of at least one glass solder insulator present within the sensor can be lastingly ensured. For example, some embodiments include a method for the production of a sensor (100) which is designed to be used in an exhaust gas stream of an internal combustion engine, wherein the sensor (100) comprises at least one first electrode (130) and at least one second electrode (150) at a distance from the first electrode, wherein the method comprises the steps of: arranging at least one glass solder (162, 164) in a mold in such a way that the at least one glass solder (162, 164) is arranged substantially between the at least one first electrode (130) and the at least one second electrode (150), and the at least one first electrode (130) is electrically insulated from the at least one second electrode (150), arranging at least one insulating element (182, 184, 186, 188) in the mold in such a way that the at least one insulating element (182, 184, 186, 188) is in contact with at least one region of a free surface of the at least one glass solder (162, 164), and finish molding the at least one glass solder (162, 164) into at least one glass insulator (162, 164) in such a way that the at least one glass insulator (162, 164) together with the at least one insulating element (182, 184, 186, 188) is positioned in a predetermined position relative to the at least one first electrode (130) and the at least one second electrode (150), wherein the insulating element (182, 184, 186, 188) is designed to at least partially shape the at least one glass insulator (162, 164) during the finish molding of the at least one glass insulator (162, 164) and to at least partially isolate the at least one glass insulator (162, 164) during a measuring operation of the sensor (100) from the exhaust gas of the internal combustion engine.

In some embodiments, the at least one first electrode (130) extends substantially along a longitudinal axis (102), the at least one second electrode (150) is arranged substantially coaxially around the at least one first electrode (130), the at least one glass insulator (162, 164) extends radially from the at least one first electrode (130) to the at least one second electrode (150), and the at least one insulating element (182, 184, 186, 188) is in contact with a region of an axial side surface of the at least one glass insulator (162, 164).

In some embodiments, the at least one insulating element (182, 184, 186, 188) is substantially in contact with the entire free axial side surface of the at least one glass insulator (162, 164).

In some embodiments, the finish molding of the at least one glass insulator (162, 164) comprises a heating and maintaining of the at least one glass insulator (162, 164) at a predetermined temperature for a predetermined period of time.

In some embodiments, the method also includes arranging at least one guard electrode (170) which is electrically insulated from the first electrode (130) and the second electrode (150) by means of the at least one glass insulator (162, 164).

As another example, some embodiments include a sensor (100) for use in an exhaust gas stream of an internal combustion engine, wherein the sensor (100) comprises: at least one first electrode (130), at least one second electrode (150) at a distance from the first electrode (130), at least one glass insulator (162, 164) arranged between the at least one first electrode (130) and the at least one second electrode (150), which is designed to electrically insulate the at least one first electrode (130) from the at least one second electrode (150), and at least one insulating element (182, 184, 186, 188) which is in contact with at least one region of a free surface of the at least one glass insulator (162, 164).

In some embodiments, the at least one first electrode (130) extends substantially along a longitudinal axis (102), the at least one second electrode (150) is arranged substantially coaxially around the at least one first electrode (130), the at least one glass insulator (162, 164) extends radially from the at least one first electrode (130) to the at least one second electrode (150), and the at least one insulating element (182,

184, 186, 188) is in contact with a region of an axial side surface of the at least one glass insulator (162, 164).

In some embodiments, the at least one insulating element (182, 184, 186, 188) is substantially in contact with the entire free axial side surface of the at least one glass insulator (162, 164).

In some embodiments, the sensor is designed as an electrostatic particle sensor (100) for determining the quantity of particles in the exhaust gas stream of the internal combustion engine.

In some embodiments, there is at least one guard electrode (170) which is electrically insulated from the first electrode (130) and the second electrode (150) by means of the at least one glass insulator (162, 164).

BRIEF DESCRIPTION OF THE DRAWING

Further features and tasks of the present disclosure will be clear to the expert through practice of the present teachings and consideration of the one appended drawing, which shows a sectional view along a longitudinal axis of a sensor incorporating the teachings of the present disclosure.

DETAILED DESCRIPTION

For sensors that are used in the exhaust gas stream of an internal combustion engine, providing glass solders as glass insulators during the production process and, during the finish molding process of the glass solders to make glass insulators, using insulating elements instead of graphite mold elements, said insulating elements may remain inside the sensor after the finish molding of the glass insulator and being able additionally to provide the function of a corrosion protection of the produced glass insulator. The insulating elements used are in particular characterized by a very high electrical resistance, for example a resistivity that is greater than $10^{11}$ [$\Omega$m] at room temperature.

Some embodiments include a method for producing a sensor that is designed to be used in an exhaust tract of an internal combustion engine. The sensor comprises at least one first electrode and at least one second electrode at a distance from the first electrode. The method then comprises an arrangement of at least one glass solder in a mold in such a way that the at least one glass solder is arranged substantially between the at least one first electrode and the at least one second electrode, and the at least one first electrode is electrically insulated from the at least one second electrode.

In some embodiments, the method further comprises an arrangement of at least one insulating element in the mold in such a way that the at least one insulating element is in contact with at least one region of a free surface of the at least one glass solder. In some embodiments, the method further comprises a finish molding of the at least one glass solder into at least one glass insulator in such a way that the at least one glass insulator is positioned together with the at least one insulating element in a predetermined position relative to the at least one first electrode and the at least one second electrode. The insulating element is designed at least partially to mold the at least one glass insulator during the finish molding of the at least one glass insulator, and, during a measurement operation of the sensor, to at least partially isolate the at least one glass insulator from the exhaust gas of the internal combustion engine.

In some embodiments, the at least one insulating element remains inside the sensor and can at least partially prevent the exhaust gas that flows into the sensor from corroding the glass insulator. A corrosion protection for the at least one glass insulator can in this way be partially provided through the at least one insulating element, and the durability of the electrical insulation of the glass insulator improved.

In some embodiments, the at least one first electrode extends substantially along a longitudinal axis, the at least one second electrode is arranged substantially coaxially around the at least one first electrode, the at least one glass insulator extends in the radial direction from the at least one first electrode to the at least one second electrode, and the at least one insulating element is in contact with a region of an axial side surface of the at least one glass insulator.

In some embodiments, the at least one insulating element is in contact with substantially the entire free axial side surface of the at least one glass insulator. As a result, the entire axial side surface of the at least one glass insulator that faces toward the exhaust gas can be protected from coming into contact with the exhaust gas and being corroded by the exhaust gas.

In some embodiments, the finish molding of the at least one glass insulator comprises a heating and maintaining of the at least one glass insulator at a predetermined temperature for a predetermined period of time. The predetermined temperature lies, for example, in a range between about 600° C. and about 1000° C., and the predetermined period of time lies in a range between about 2 minutes and about 60 minutes.

In some embodiments, the method further comprises an arrangement of at least one guard electrode which is electrically insulated from the first electrode and from the second electrode by means of the at least one glass insulator. The guard electrode may be designed to dissipate any possible leakage currents that flow between the first electrode and the second electrode over the surface of the glass insulator and/or the insulating elements.

In some embodiments, a plurality of insulating elements are provided within the sensor in such a way that substantially all the free surfaces of the glass insulators are covered by the insulating elements and consequently shielded from the exhaust gas. In some embodiments, the free surfaces of the glass insulators that face away from the exhaust gas are thus also substantially covered by the insulating elements in addition to the free surfaces of the glass insulators that face toward the exhaust gas.

In some embodiments, a sensor for use in an exhaust gas stream of an internal combustion engine comprises at least one first electrode, at least one second electrode at a distance from the first electrode, at least one glass insulator arranged between the at least one first electrode and the at least one second electrode, said insulator being designed to electrically insulate the at least one first electrode from the at least one second electrode, and at least one insulating element that is in contact with at least one region of a free surface of the at least one glass insulator. The at least one insulating element is here already present during the finish molding process of the at least one glass solder into the at least one glass insulator, and remains within the sensor after the finish molding.

In some embodiments, the at least one first electrode extends substantially along a longitudinal axis, the at least one second electrode is arranged substantially coaxially around the at least one first electrode, the at least one glass insulator extends in the radial direction from the at least one first electrode to the at least one second electrode, and the at least one insulating element is in contact with a region of an axial side surface of the at least one glass insulator.

In some embodiments, the at least one insulating element is substantially in contact with the entire, free, axial side surface of the at least one first glass insulator that faces toward the exhaust gas. As a result, substantially the entire axial side surface of the at least one glass insulator that faces toward the exhaust gas can be protected from coming into contact with the exhaust gas and being corroded by the exhaust gas.

In some embodiments, the sensor comprises an electrostatic particle sensor for determining the particle quantity in the exhaust gas stream of the internal combustion engine. In some embodiments, the sensor comprises at least one guard electrode which is electrically insulated by means of the at least one glass insulator from the first electrode and from the second electrode. The at least one insulating element may comprise a material with very high electrical resistance, for example of a ceramic material or a glass material with a melting point that is higher than the melting point of the glass insulator. The at least one insulating element may comprise $Al_2O_3$.

The terms "glass solder" and "glass insulator" are used in the present disclosure. In this context, the term "glass solder" describes an original state of the "glass insulator", and is a mass consisting of a glass material that hardens at least partially into the glass insulator by means of heating and maintaining at a predetermined temperature for a predetermined period of time. The term "glass insulator" consequently describes a finished state of the glass solder and is a substantially solid body that has been formed from the mass of glass solder material.

In some embodiments, the original glass solder may be formed of a glass powder that is processed to form a pressing by means of pressing and sintering. This pressing thus describes the glass solder that is processed into the glass insulator by means of the method described herein. The predominant proportion of the glass insulator here is crystallized, and thus does not describe a fully amorphous object.

Further, the term "finish molding" in the context of the present disclosure refers to a hardening or finish molding process of the glass solder at a predetermined temperature for a predetermined period of time. The finish molding takes place at a temperature of, for example, between about 600° C. and about 1000° C. for a predetermined period of time of about 2 minutes to about 60 minutes.

Referring to the FIGURE, a sectional view through a particle sensor 100, which is designed to determine the quantity of particles in an exhaust gas stream of an internal combustion engine (not illustrated), is shown. The particle sensor 100 of FIG. 1 comprises a substantially cylindrical housing 110 extending along a longitudinal axis 102. In some embodiments, the housing 110 can be designed in conical or stepped fashion.

The housing 110 further has a threaded section 112, by means of which the particle sensor 100 can be screwed into an exhaust gas duct of an internal combustion engine (not illustrated), for example. The housing 110 furthermore has a region 114, for example in the form of an external hexagon, to which a corresponding tool can be attached in order that the particle sensor 100 can be screwed into the exhaust gas duct of the internal combustion engine as desired.

A measuring region 120 is provided within the housing 110, said measuring region extending between a first housing region 116, which is designed, in an installed state of the particle sensor 100, to project at least partly into a gas stream (indicated by an arrow 10 in the FIGURE) flowing through the exhaust gas duct of the internal combustion engine, and a second housing region 118 substantially along the longitudinal axis 102. In particular, the first housing region 116 describes a front-end region of the housing 110 and the second housing region 118 describes a rear housing region of the housing 110 that is at a distance from the first housing region 116. Put more precisely, the measuring region 120 is specified or defined by the first housing region 116 and the second housing region 118 in a direction parallel to the longitudinal axis 102.

The housing 110 further comprises a further third housing region 119 extending backward along the longitudinal axis 102 and located opposite to the first housing region 116. Further elements, for example contact elements for electrically contacting the sensor 100, are housed in the third housing region 119.

A substantially cylindrical first electrode 130, which extends substantially along the longitudinal axis 102, is arranged in the measuring region 120. In some embodiments, the first electrode 130 can be designed in a conical or stepped fashion. The first electrode 130 comprises a measuring section 132 arranged within the measuring region 120, and also a connecting section 134 extending along the longitudinal axis 102 through the second housing region 118 into the third housing region 119. The measuring section 132 is, for example, a hollow cylindrical region and is connected rigidly to the connecting section 134. The measuring section 132 can, alternatively, be designed integrally or as one piece with the connecting section 134. The first electrode 130 can, for example, be connected to a control unit of the vehicle and supplied with current via the connecting section 134.

The particle sensor 100 according to the FIGURE further comprises a substantially cylindrical current carrying element 140 which is arranged in the measuring region 120 in a radial direction with respect to the longitudinal axis 102 outside the first electrode 130 and coaxially to that. In further embodiments, the current carrying element 140 can have a conical or stepped shape. In particular, the current carrying element 140 is arranged around the measuring section 132 of the first electrode 130 in such a way that a first flow path 104 is formed between a radial inner wall 111 of the housing 110 and a radial outer wall 141 of the current carrying element 140 in such a way that the gas stream flows through the first flow path 104 from the first housing region 116 in the direction of the second housing region 118, and a second flow path 106 is formed between the first electrode 130 and the current carrying element 140 in such a way that the gas stream flows through the second flow path 106 from the second housing region 118 in the direction of the first housing region 116.

In the FIGURE, the flow direction of the gas stream through the first flow path 104 is indicated by an arrow 12 and the flow direction through the second flow path 106 is indicated by an arrow 14. The passage of the gas stream out of the first flow path 104 into the second flow path 106 is indicated with an arrow 18. In order that the gas stream 10 can flow through the measuring region 120, the housing 110 has in the first housing region 116 at least one inlet opening 101, which is provided in the jacket of the housing 110, and also an outlet opening 103 extending, for example, along the longitudinal axis 102.

In the example illustrated, the housing 110 simultaneously forms a second electrode 150 which is preferably designed as a ground electrode. During the operation of the electrostatic particle sensor 100, a first voltage potential, for example 1000 V, is applied to the first electrode 130 which lies far above a second voltage potential, for example 0 V, which is applied to the second electrode 150.

In some embodiments, the first electrode 130, put more precisely the connecting section 134 of the first electrode 130, is electrically insulated from the second electrode 150 by a first glass insulator 162 and a second glass insulator 164. The presence of two glass insulators 162, 164 is due to the fact that the electrostatic particle sensor 100 illustrated further comprises a guard electrode 170, which is electrically insulated from the first electrode 130 and the second electrode 150 by means of the glass insulator 165, 164, and is designed to dissipate any leakage currents that may arise inside the sensor. In some embodiments, the guard electrode 170 is a tubular component arranged coaxially with respect to the longitudinal axis 102.

On the one axial side, the glass insulators 162, 164 are covered by insulating elements 182, 184, which are for example made of a ceramic material, and are at least partially held in a predetermined position by these. On the other axial side, the glass insulators 162, 164 are covered and at least partially held in position by two further insulating elements 186, 188. The glass insulators 162, 164 are consequently covered, in relation to the longitudinal axis 102, in the radial direction by the first electrode 130, the guard electrode 170 and the second electrode 150, and in the axial direction by the respective insulating elements 182, 184, 186, 188, and thus have almost no surfaces accessible to the exhaust gas.

The insulating elements 182, 184, 186, 188 remain even during the measuring operation of the electrostatic particle sensor 100, and are designed to protect the glass insulators 162, 164 at least partially from coming into contact with exhaust gas and the glass insulators 162, 164 being at least partially corroded thereby.

An exemplary production process of the electrostatic particle sensor 100 follows. The first electrode 130, complete with the measuring section 132 and the connecting section 134, is first positioned in a mold in which the second electrode 150, which in the illustrated example simultaneously also forms the housing 110 of the electrostatic particle sensor 100, has already been inserted. The two insulating elements 182, 184 are thereupon arranged in the mold together with the guard electrode 170.

Subsequently, the glass solder 162 is arranged between the first electrode 130 and the guard electrode 170, and a further glass solder 164 between the guard electrode 170 and the second electrode 150, in such a way that the two glass solders 162, 164, which in this state consist of a glass mass, are in contact with the respective insulating element 182, 184. The glass solders 162, 164 are here at least partially maintained in a desired shape by the insulating elements 182, 184. In this state, the glass solders 162, 164 are positioned in a first axial direction (in the direction to the right in FIG. 1).

The further insulating elements 186, 188 are thereupon arranged between the first electrode 130 and the guard electrode 170 and between the guard electrode 170 and the second electrode 150 for the further positioning and shaping of the glass solders 162, 164, and are in turn brought into contact with the glass solders 162, 164. In this state, the glass solders 162, 164 are also positioned in a second axial direction opposed to the first axial direction (in the direction to the left in the FIGURE).

The insulating elements 182, 184, 186, 188 can, for example, be held in position by constructive measures such as press-fits, positive locking or the like, or by a placement of weights thereon during the finish molding. The insulating elements 182, 184, 186, 188 thus at least partially define the shape of the glass solders 162, 164, and position the glass solders 162, 164 relative to the first electrode 130 and to the second electrode 150. The positioning of the glass solders 162, 164 in the radial direction may be achieved through the first electrode 130, the guard electrode 170 and the second electrode 150, which are already arranged in the mold.

After all the components have been arranged within the mold, this arrangement is heated to a predetermined temperature, for example to a temperature between about 600° C. and about 1000° C., and maintained at this predetermined temperature for a predetermined period of time, for example for a period of time between about 2 minutes and about 60 minutes. The heating and maintaining of this arrangement, in particular of the glass solders, at the predetermined temperature for a predetermined period of time is referred to in the context of the present disclosure as "finish molding". During this finish molding or baking process, substantially solid glass insulators 162, 164 are formed from the temporarily viscous glass solder masses.

After the finish molding process of the glass insulators 162, 164, all of the insulating elements 182, 184, 186, 188 remain within the third housing region 119 and are not removed, in contrast to the practice usual from the prior art when graphite mold elements are used. The insulating elements 182, 184, 186, 188 here adhere firmly to the glass insulators 162, 164 after glazing.

The insulating elements 182, 184, 186, 188 offer the advantage that the glass insulators 162, 164 are substantially completely shielded from the exhaust gas, and the exhaust gas can thus not corrode the glass insulators 162, 164. It is, furthermore, advantageous in contrast to the prior art that no graphite can remain in or at the glass solders or glass insulators 162, 164 which during the operation of the sensor 100 can lead to a negative impairment of the insulating properties of the glass insulators 162, 164. The insulating elements 182, 184, 186, 188 furthermore enlarge the creepage distance of the glass insulators 162, 164 in the axial direction. The durability of the glass insulators 162, 164 can thereby be improved.

The teachings of the present disclosure find application in particular with sensors that are employed in an acid environment and/or at high temperatures and which are operated at high voltages.

What is claimed is:

1. A method for the production of a sensor for an exhaust gas stream of an internal combustion engine, wherein the sensor comprises a first electrode having a measuring section and a connection section, and a second electrode, wherein the method comprises:
   arranging a glass solder in a mold substantially between and substantially insulating the connecting section of the first electrode from the second electrode without intruding between the measurement section of the first electrode and the second electrode;
   arranging an insulating element in the mold in contact with a free axial surface of the glass solder; and
   finish molding the glass solder into a glass insulator together with the insulating element in a predetermined position relative to the connecting section of the first electrode and the second electrode;
   wherein the insulating element shapes the glass insulator during the finish molding and at least partially isolates the glass insulator from the exhaust gas of the internal combustion engine during a measuring operation of the sensor.

2. The method as claimed in claim 1, wherein:
   the first electrode extends along a longitudinal axis;
   the second electrode is arranged substantially coaxially around the first electrode;

the glass insulator extends radially from the first electrode to the second electrode; and the insulating element is in contact with an axial side surface of the glass insulator.

3. The method as claimed in claim 2, wherein the insulating element is in contact with substantially all of the free axial side surface of the glass insulator.

4. The method as claimed in claim 1, wherein the finish molding of the glass insulator comprises heating the glass insulator and maintaining a predetermined temperature for a predetermined period of time.

5. The method as claimed in claim 1, further comprising arranging a guard electrode electrically insulated from the first electrode and the second electrode by means of the glass insulator.

6. A sensor for an exhaust gas stream of an internal combustion engine, the sensor comprising:

a first electrode extending along a longitudinal axis, the first electrode including a measuring section and a connecting section;

a second electrode extending along the longitudinal axis surrounding the first electrode radially at a distance from the first electrode;

a glass insulator arranged between and electrically insulating the connecting section of the first electrode from the second electrode without insulating the measuring section of the first electrode from the second electrode; and an insulating element in contact with a free axial surface of the glass insulator.

7. The sensor as claimed in claim 6, wherein the glass insulator extends radially from the first electrode to the second electrode.

8. The sensor as claimed in claim 6, wherein the insulating element is in contact with substantially the entire free axial side surface of the glass insulator.

9. The sensor as claimed in claim 6, wherein the sensor comprises an electrostatic particle sensor for determining the quantity of particles in the exhaust gas stream of the internal combustion engine.

10. The sensor as claimed in claim 6, further comprising a guard electrode electrically insulated from the first electrode and the second electrode by the glass insulator.

* * * * *